(12) United States Patent
Jacobsen

(10) Patent No.: US 9,901,091 B2
(45) Date of Patent: Feb. 27, 2018

(54) GAME CALL WITH VOLUME ENHANCING AND TONE STABILIZING COIL SPRING

(71) Applicant: Rockie Jacobsen, Kamiah, ID (US)

(72) Inventor: Rockie Jacobsen, Kamiah, ID (US)

( * ) Notice: Subject to any disclaimer, the term of this patent is extended or adjusted under 35 U.S.C. 154(b) by 0 days.

(21) Appl. No.: 15/068,505

(22) Filed: Mar. 11, 2016

(65) Prior Publication Data

US 2017/0258071 A1 Sep. 14, 2017

(51) Int. Cl.
*A63H 5/00* (2006.01)
*A01M 31/00* (2006.01)

(52) U.S. Cl.
CPC .................. *A01M 31/004* (2013.01)

(58) Field of Classification Search
USPC ....... 446/202, 206, 207, 208, 213, 397, 404, 446/416, 418
See application file for complete search history.

(56) References Cited

U.S. PATENT DOCUMENTS

| | | | | | |
|---|---|---|---|---|---|
| 3,968,592 | A | * | 7/1976 | Piper | A01M 31/004 446/193 |
| 4,211,031 | A | * | 7/1980 | Gambino | G10D 7/12 43/1 |
| 5,503,585 | A | * | 4/1996 | Heineman | A01M 31/004 43/2 |
| 5,813,899 | A | * | 9/1998 | Hartley | G10K 3/00 446/422 |
| 5,910,039 | A | * | 6/1999 | Primos | A01M 31/004 446/207 |
| 6,053,794 | A | * | 4/2000 | Weiser | A01M 31/004 446/207 |
| 6,168,493 | B1 | * | 1/2001 | Kirby | A01M 31/004 446/397 |
| 6,435,933 | B1 | * | 8/2002 | Browne | A01M 31/004 446/207 |
| 6,527,614 | B1 | * | 3/2003 | Primos | A01M 31/004 446/207 |
| 6,575,804 | B1 | * | 6/2003 | Primos | A63H 5/00 446/193 |
| 7,011,563 | B2 | * | 3/2006 | Ady | A01M 31/004 446/207 |
| 7,658,660 | B1 | * | 2/2010 | Drury | A01M 31/004 446/206 |
| 8,142,253 | B2 | * | 3/2012 | Peel | A01M 31/004 446/397 |

(Continued)

*Primary Examiner* — Kurt Fernstrom
(74) *Attorney, Agent, or Firm* — Duncan Palmatier

(57) ABSTRACT

The present invention utilizes a sized coil spring placed in the end of game call tubes, or mouthpieces that go into such tubes. When air is blown into the tube or mouthpiece, the air passes over and through the coil spring, causing the spring to vibrate and make a whirlwind effect. The vibrating coil spring increases the volume of the sound and also stabilizes each tone created on the mouthpiece or tube. The higher tones, or notes, are more easily obtained and become easier to reach and hold with consistency. The coil spring also helps to increase back pressure, making it easier to blow into call with less air to make the call work. This invention can be used in all types of game calls, such as calls for elk, deer, moose, wolves, predators, geese, ducks, and even some turkey calls. The invention makes the desired sounds more realistic and user friendly.

15 Claims, 4 Drawing Sheets

(56) References Cited

U.S. PATENT DOCUMENTS

| | | | |
|---|---|---|---|
| 8,216,019 B2* | 7/2012 | Burcham | A01M 31/004 446/129 |
| 8,398,452 B2* | 3/2013 | Coin | A01M 31/004 446/207 |
| 8,535,112 B2* | 9/2013 | Dukart | A01M 31/004 446/397 |
| 8,727,828 B2* | 5/2014 | Pribbanow | A01M 31/004 446/202 |
| 2007/0037471 A1* | 2/2007 | Pepin | A01M 31/004 446/207 |
| 2013/0309934 A1* | 11/2013 | Wiley | A01M 31/004 446/188 |
| 2014/0065924 A1* | 3/2014 | Dillon | A01M 31/004 446/202 |

* cited by examiner

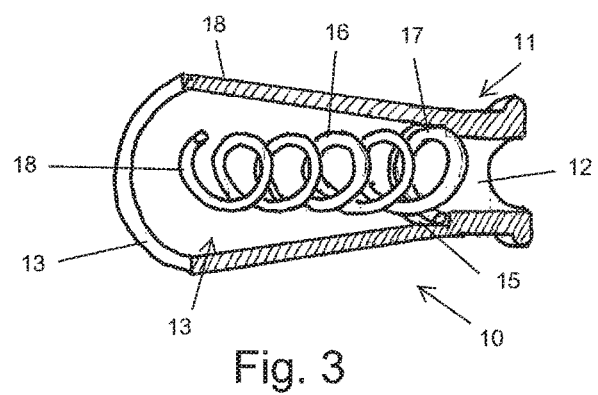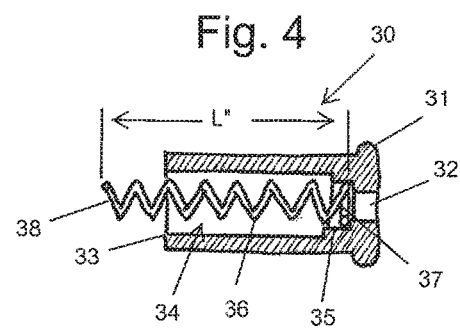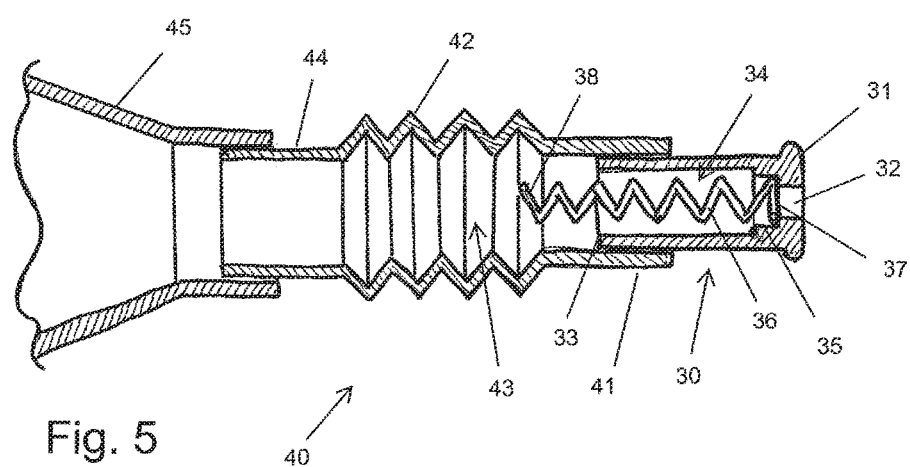

GAME CALL WITH VOLUME ENHANCING AND TONE STABILIZING COIL SPRING

FIELD OF THE INVENTION

The present invention relates generally to game calls and, more specifically, to a game call that enhances the volume and stabilizes the tone of the call by means of a coil spring disposed in the call's airstream column, secured at an end proximate to the mouthpiece, but unrestrained along the spring's length and distal end. An unrestrained coil spring of the present invention may also be placed in a turkey box call to enhance and stabilize the call's tones.

BACKGROUND OF THE INVENTION

Game calls are intended to produce sounds similar to those of wild animals so as to attract them toward hunters, wildlife watchers, or scientists. Game calls have also generated competitions and performances amongst persons attempting to simulate accurately the sounds of wild animals.

One category of game call uses air, usually from a person blowing into a call. Such calls include simple pipes for forming and amplifying the user's sounds. Other such calls use a reed or diaphragm over which air is directed to cause the reed to vibrate and produce desired sounds. An example of a reed call is the "Moose Call" described in U.S. Pat. No. 3,772,823 to Herter. Herter's moose call (10) has a mouthpiece (11) with a rear end (12) for the user's mouth. The user blows into the mouthpiece (11) through a longitudinal passage (13) and over a vibratable reed (14) secured by a reed mounting structure (15). The air continues into an air passage (16) to a flared outlet end (17). The reed (14) produces a sound when the user blows air past it and the sound then passes out through the flared outlet (17).

Producing a realistic call that will attract game requires significant skill and can be beyond the abilities of most people. Many attempts have been made to provide game calls that ease the difficulties of making realistic sounds. Reed calls were one means to assist people in producing realistic sounds, but they are still difficult to use consistently and convincingly. In addition to producing a sound, a realistic call requires consistent tone as well as the ability to hit different notes. One example of a game call intended to provide a game call that can be easily manipulated to produce a variety of sounds to simulate sounds of wildlife animals is described in U.S. Pat. No. 6,575,804 to Primos, which discloses a game call with a reed (78) in a main assembly (32), an "enhancer section" (36), a "reciprocating reed engagement member" (44), and collapsible bellows (32). The user's fingers collapse the bellows (32) and push forward the reed engagement member (44) to produce different sounds. See Primos, column 8, at lines 51 through 64. Primos does not address the issue of increasing the call's volume or stabilizing the notes produced by the reed. Moreover, Primos is directed only to reed calls and does not assist more simple game calls with which the user produces the sounds into a tube and the call serves as a simple pipe, such as the one shown as reference number 7 in FIGS. 1 and 4 of U.S. Pat. No. 7,234,987 to Brazil.

Similar problems arise with friction-type calls, often used as turkey calls. One example of such a call is shown in U.S. Pat. No. 8,142,253 to Peel, which contains lists and descriptions of prior art turkey calls and discloses a turkey call with an interchangeable paddle/striker (10). As with game calls that use air to produce sounds, the prior art friction-type turkey calls have difficulty producing a realistic call requires with consistent tones.

What is needed is a game call that can enhance a call's volume without increasing the amount and force of air or pressure required from the user. Also need is a game call that will stabilize the tones produced and assist in changing those tones. Also needed is a game call that can provide these improvements for many different types of game calls, whether or not they employ reeds or other sound-producing, devices, and whether or not they are small or large calls.

SUMMARY OF INVENTION

The present invention utilizes an unrestrained, sized coil spring placed in the end of game call tubes, or mouthpieces that go into such tubes. When air is blown into the tube or mouthpiece, the air passes over and through the coil spring, causing the spring to vibrate and make a whirlwind effect. The vibrating coil spring increases the volume of the sound and also stabilizes each tone created on the mouthpiece or tube. The higher tones, or notes, are more easily obtained and become easier to reach and hold with consistency. The coil spring also helps to increase back pressure, making it easier to blow into call with less air to make the call work. This invention can be used in all types of game calls, such as calls for elk, deer, moose, wolves, predators, geese, ducks, and even some turkey calls. The invention makes the desired sounds more realistic and user friendly.

The present invention is a game call with an unrestrained coil spring that enhances the volume of the call while also stabilizing the notes produced. The coil spring is secured to the call's mouthpiece at the end proximal the user's mouth, but the spring is unrestrained along its length and its distal end, allowing the spring to vibrate freely within the call's air column. The coil spring enhances the volume of the call and stabilizes the tones that can be produced. The coil spring also makes easier the transition between different tones and the ability to reach higher pitched tones. This invention may also be used in friction-type calls, such as turkey calls, that use friction between parts, usually wood, to produce sound. In a turkey call box, an unrestrained coil spring secured at one end to the box and unrestrained at the opposite end enhances the call's volume and stabilizes the tones that can be produced.

BRIEF DESCRIPTION OF DRAWINGS

FIG. 3 is a three-quarter, cut-away, perspective view of a preferred embodiment of the simple game call of the present invention.

FIG. 4 is a side, cut-away view of a simple game call mouthpiece utilizing the present invention.

FIG. 5 is a side, cut-away view of the simple call mouthpiece incorporated into a large game tube and bugle utilizing the present invention.

DETAILED DESCRIPTION OF SPECIFIC EMBODIMENTS

Figure 1:
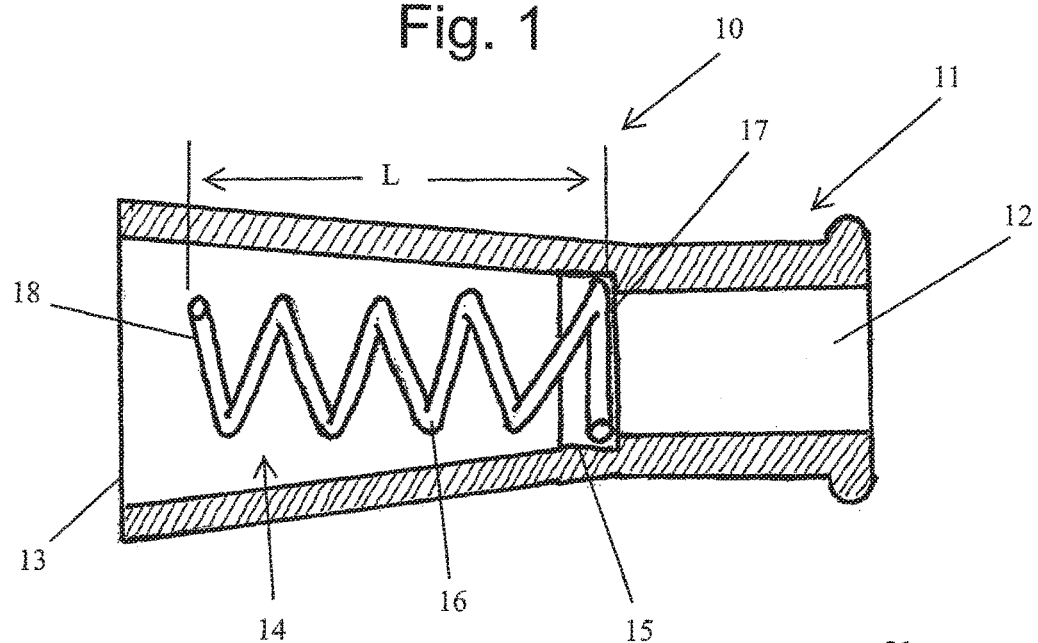
FIG. 1 is a side, cut-away view of the preferred embodiment of a simple game call of the present invention.
Figure 2:
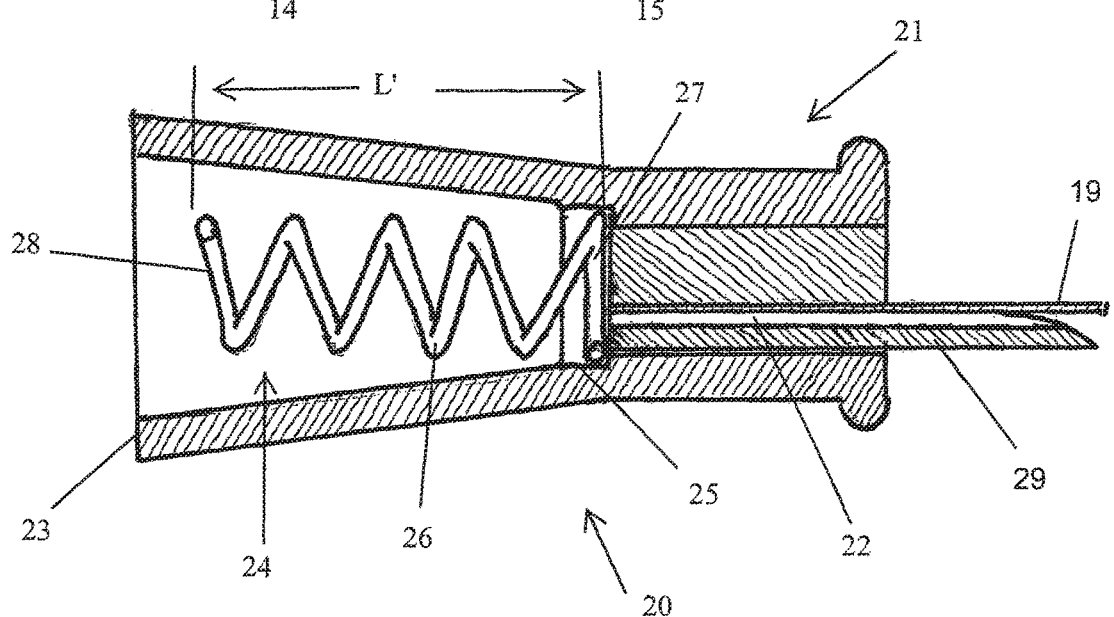
FIG. 2 is a side, cut-away view of the preferred embodiment of a reed-type game call of the present invention.

FIGS. 1 and 3 show a preferred embodiment of a simple game call device of the present invention. The game call 10 used here for illustration is a simple pipe comprising a mouthpiece 11 having a mouthpiece length, air passage 12, and bell 13. A user makes a sound simulating an animal's call into a mouth aperture at the mouth end of the mouthpiece 11 and the air passes through the passage 12 into the interior space 14 of flared bell 13. The second bell end has an inner diameter that is larger than the inner diameter of the first bell end, thereby forming the interior bell space 14 of the flared bell 13. Within the mouthpiece 11, proximal to the user's mouth (not shown), is a seat 15 for an end 17 of the coil spring 16 proximal to the portion of the mouthpiece 11 where a user's mouth (not shown) blows into the call 10. The proximal end 17 of the spring 16 can be secured to the seat 15 by many means, such as a friction fit, as shown, or by clamping, threads or adhesive. The coil spring 16 has a length L extending through the air passage 12 and into the bell space 14. The length L and distal end 18 of the spring 16 are unrestrained and free to vibrate within the air passage 12 and bell space 14. The radius and length of the coil spring 16 depend on the size of the call. For a small, pipe-type call, with an air passage 12 diameter of approximately ¾" and overall call length of about 3½", it has been found that a coil spring 16 of between 12 and 16 gauge, diameter of about ⅝" to ¾", and a length of about 2½" to 2¾" works best. It has been found that, for such a pipe call, a coil spring 16 of 14 gauge, 0.62" in diameter, and 2.6" in length works well. For such a call, these dimensions translate to a ratio of coil spring length to call length of about 2:5 to 3:5 works well. During operation, it is undesirable that the spring 16 should be so flexible or proportioned that its length L or distal end 18 hit the interior walls of the bell space 14 or any other part of the call 10. In the embodiment shown in FIG. 1, the distal end 18 of the spring 16 is located entirely within the bell space 14, but the spring 16 may extend beyond the open bell 13, as shown in FIGS. 2 through 4. When air is blown into the mouthpiece 11, air passes over and through the coil spring 16, causing the unrestrained portion of the spring 16 to vibrate and make a whirlwind effect. The vibrating coil spring 16 increases the volume of the sound and also stabilizes each tone created on the mouthpiece or tube.

FIG. 2 is a side, cut-away view of a preferred embodiment of a reed-type game call utilizing the unrestrained coil spring of the present invention. The game call 20 comprises a mouthpiece 21, air passage 22, and bell 23. Within the air passage 22 is a reed holder assembly 29 for holding a reed 19 within the air passage 22 and in position for a user's mouth (not shown). A user blows air over the reed 19 and into mouthpiece 21. The reed 19 vibrates, making a sound which passes through the passage 22 into the interior space 24 of flared bell 23. Within the mouthpiece 21, proximal to the user's mouth (not shown), is a seat 25 for a proximal end 27 of the coil spring 26. The coil spring 26 has a length L' extending through the air passage 22 and into the bell space 24. The length L' and distal end 28 of the spring 26 are unrestrained and free to vibrate within the air passage 22 and bell space 24. When the sound produced by the reed 28 passes over and through the coil spring 26, the unrestrained portion of the spring 26 vibrates and makes a whirlwind effect, thereby increasing the volume of the sound and also stabilizes each tone created on the mouthpiece or tube.

FIG. 4 is a side, cut-away view of a preferred embodiment of a tube-type game call utilizing the unrestrained coil spring of the present invention. The game call 30 comprises a mouthpiece 31, air passage 32, and open end 33. A user makes a sound simulating an animal's call into mouthpiece 31 and the air passes through the passage 32 into an interior space 34 of the mouthpiece 31 and out the open end 33. Within the mouthpiece 31, proximal to the user's mouth (not shown), is a seat 35 for a proximal end 37 of a coil spring 36. The coil spring 36 has a length L" extending through the air passage 32 and into the interior space 34. The length L" and distal end 38 of the spring 36 are unrestrained and free to vibrate within the air passage 32 and bell space 34. When the vibrating air of the user's call passes over and through the coil spring 36, the unrestrained portion of the spring 36 vibrates and makes a whirlwind effect, thereby increasing the volume of the sound and also stabilizes each tone created on the mouthpiece or tube.

FIG. 5 is a side, cut-away view of the tube-type game call 30 incorporated in a large game call assembly 40. The open end 33 of the tube-type call 30 is received by an end 41 of a flexible accordion-type tube 42. In the disclosed embodiment, the spring 36 is proportioned such that its L" extends beyond the distal end 33 of the mouthpiece 30 and into the interior space 43 of the accordion tube 42. At the opposite end 44 of the accordion tube 42, a bugle 45 is mounted.

Figure 6:
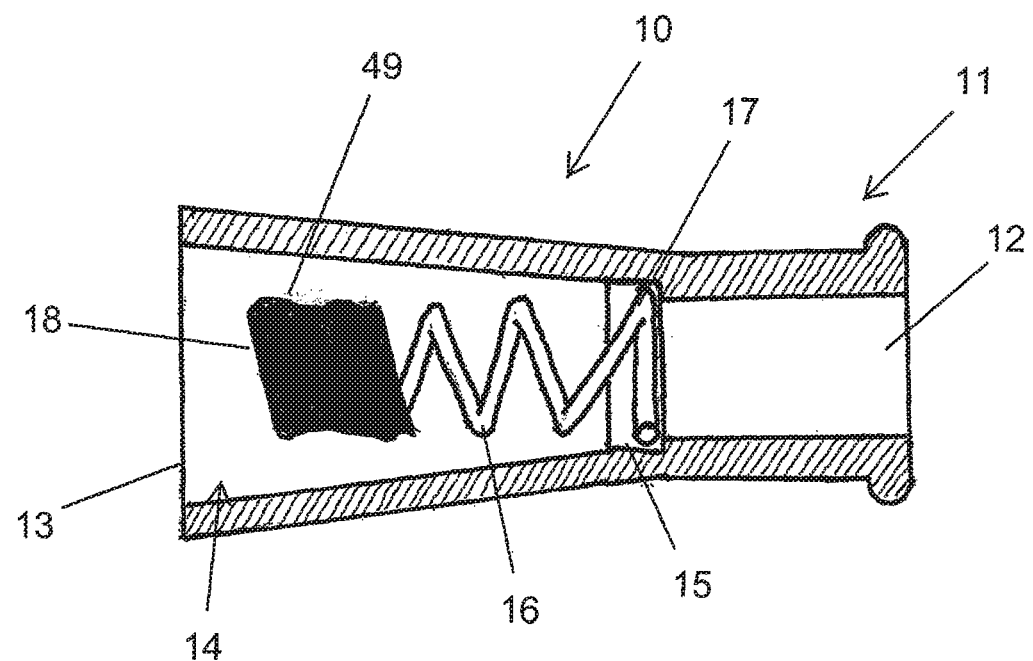
FIG. 6 is a side, cut-away view of the preferred embodiment of a simple game call of the present invention with a rubber cap over the unrestrained end of the coil spring.

FIG. 6 shows an alternative embodiment of the invention. As with the game call described in connection with FIG. 1, the call 10 is a simple pipe comprising a mouthpiece 11, air passage 12, and bell 13. A call sound passes through the passage 12 into the interior space 14 of flared bell 13. Within the mouthpiece 11, proximal to the user's mouth (not shown), a seat 15 secures an end 17 of the coil spring 16. The coil spring 16 extends through the air passage 12 and into the bell space 14. The distal end 18 of the spring 16 is unrestrained and free to vibrate within the air passage 12 and bell space 14. A rubber cap 49 is stretched over the distal end 18 of the coil spring 16 to prevent undesirable sounds in the event the distal end 18 of the spring 16 comes into contact with the interior surface of the bell 13. This alternative embodiment may also be employed with other embodiments of the invention, such as those shown in FIGS. 2, 4, 7 and 8 and described herein.

Figure 7:
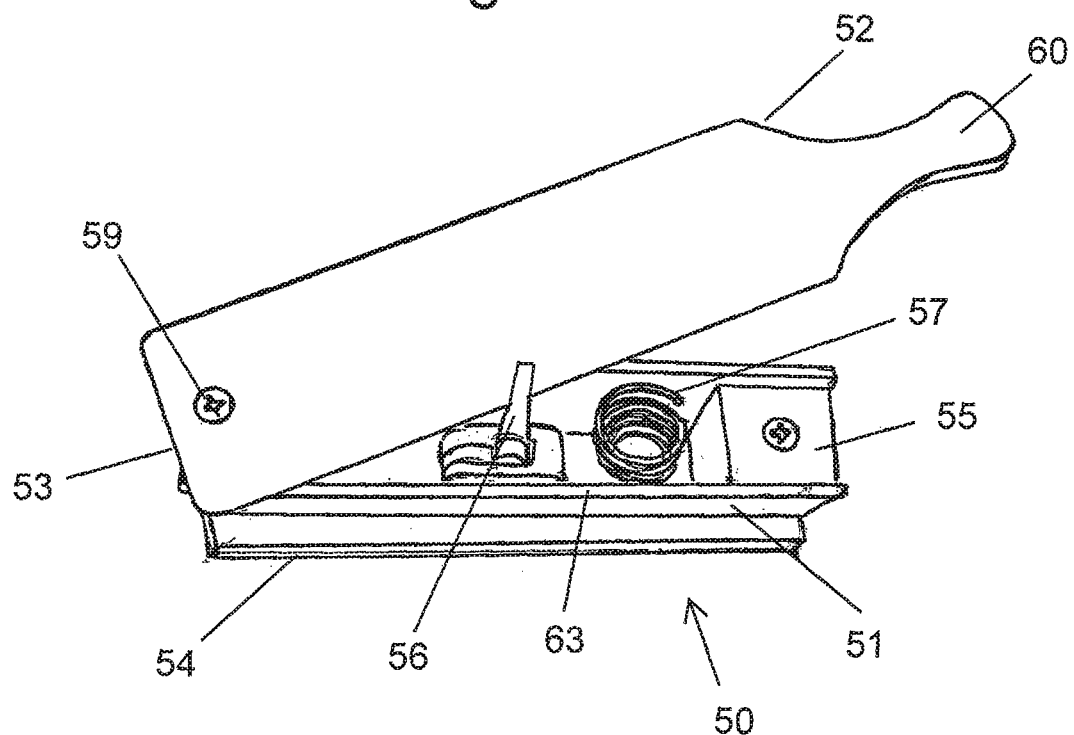
FIG. 7 is a three-quarter perspective view of a turkey call box of the present invention.
Figure 8:
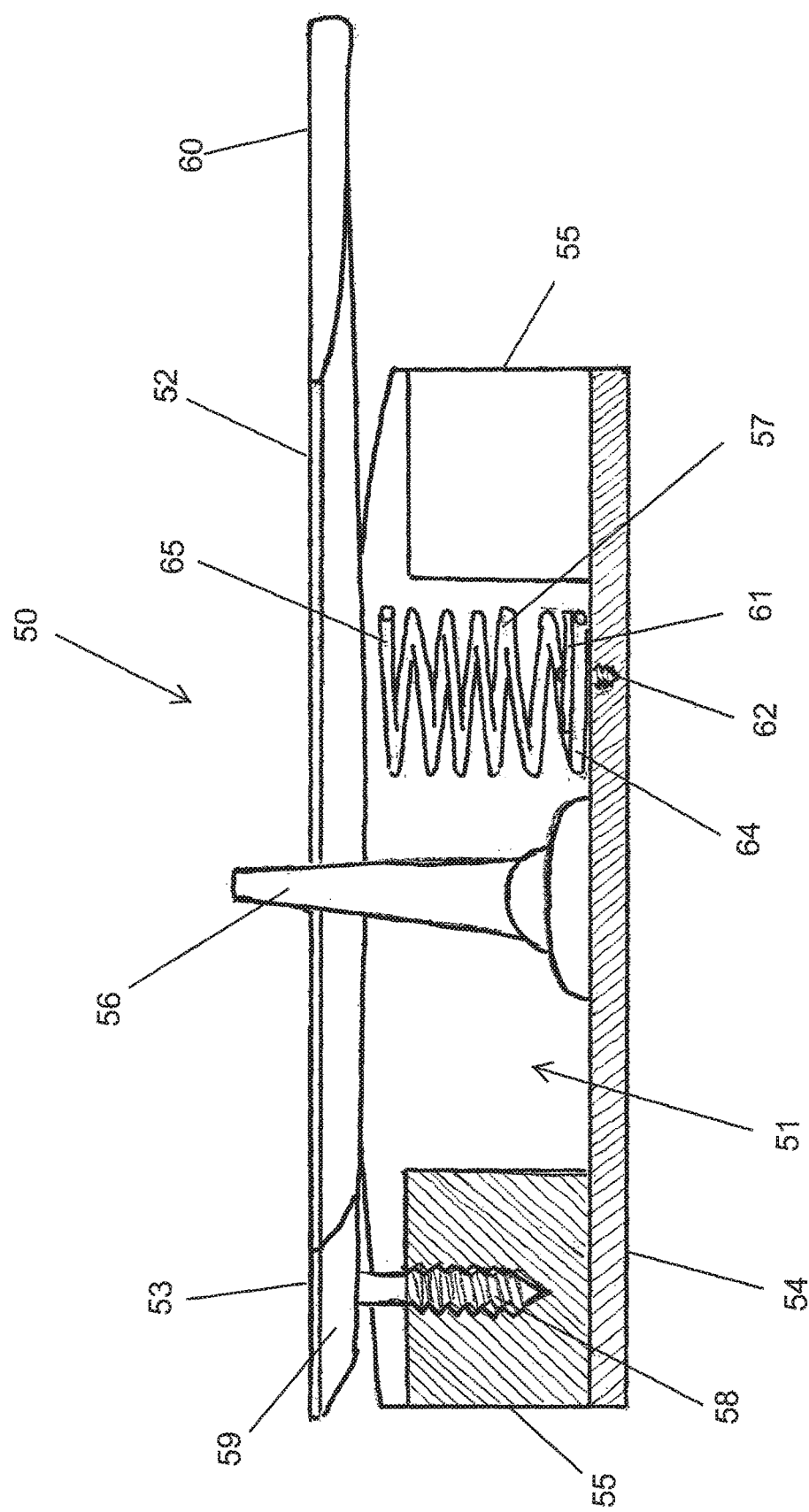
FIG. 8 is a side cut-away view of a turkey call box of the present invention.

FIGS. 7 and 8 show an alternative embodiment of the invention applied to a turkey call. A conventional turkey call box 50 forms a box 51 with a chamber space formed by a pair of oppositely disposed side walls, each side wall having an top or upper edge 63, front end and rear end walls or blocks 55, and a base 54. A paddle 52 is pivotably mounted to one end of the box 51, usually by a screw 58. The upper edges 63 of the box can be arched, as seen in FIG. 8 or flat. The paddle 52 has a paddle top surface and a paddle bottom surface that is rounded and has a handle 60 so that a user can swing the paddle 52 and rub the bottom of the paddle 52 against the top edges 63 of the box 51, thereby generating a turkey call. The turkey call box 50 shown also has a cutter bar 56 that can swing up to limit the swivel movement of the paddle. The cutter bar 56 is made of a springy material, such as steel, so that some give and resistence is provided and the user can more easily manipulate the paddle 52 over the top edges 63 of the box 51. Inside the box 51, a coil spring 57 has a base end 64 secured to the base 54 by a washer 61 and a screw 62. The opposite end 64 of the coil spring 57 is unrestrained. As described above in connection with the other disclosed calls, it has been found that a coil spring 57 of between 12 and 16 gauge works well and that a coil spring 57 of 14 gauge is preferred. As described above, the unrestrained coil spring 57 enhances the volume of the call and stabilizes the call's tones. As noted above, the cap 49, shown in FIG. 6, may also be employed with this embodiment.

The drawings and description set forth here represent only some embodiments of the invention. After considering these, skilled persons will understand that there are many ways to make a game call according to the principles disclosed. The inventor contemplates that the use of alternative structures, materials, or manufacturing techniques, which result in a game call according to the principles disclosed, will be within the scope of the invention.

I claim:

1. A game call comprising:
    a mouthpiece having a mouthpiece length, a mouth end sized to receive a user's mouth, a mouth aperture at the mouth end, the mouth aperture communicating with an air passage along the length of the mouthpiece, a mouthpiece opening located at an end opposite the mouth end, the mouthpiece opening communicating with the air passage, and a seat located in the air passage of the mouthpiece between the mouth end and the mouthpiece opening,
    a bell having first and second help ends and a bell length between the first and second bell ends, an interior hell space along the bell length between the first and second bell ends, wherein the interior hell space communicates at the first bell end with the air passage and the second bell end is open to allow the passage of air from the mouth aperture to the second bell end,
    a coil spring having proximal and distal ends and a spring length, the spring length located in the air passage of the mouthpiece and extending along the mouthpiece length into the interior bell space, wherein the proximal end of the coil spring is secured to the seat and the coil spring length and distal end are unrestrained and free to vibrate.

2. The game call of claim 1 wherein the coil spring length and distal end do not extend beyond the open second bell end.

3. The game call of claim 1 wherein the combination of the mouthpiece length and the bell length form a game call length, and wherein a ratio of the coil spring length to the game call length is in the range from 2:5 to 3:5.

4. The game call of claim 1 wherein the coil spring is formed of spring wire having a gauge between 12 and 16.

5. The game call of claim 4 wherein the coil spring is formed of spring wire having a gauge of 14.

6. The game call of claim 1 wherein the second bell end has a second bell end inner diameter and the first bell end has a first bell end inner diameter, and wherein second bell end inner diameter is larger than the first bell end inner diameter and the interior bell space forms a flared bell.

7. The game call of claim 1 wherein the proximal end of the coil spring is secured to the seat by a friction fit.

8. The game call of claim 1 further comprising a means for securing the proximal end of the coil spring to the seat.

9. The game call of claim 1 further comprising a rubber cap over the distal end of the coil spring.

10. The game call of claim 1 wherein the mouthpiece further comprises a reed, and wherein the reed is secured within the air passage and extends through the mouthpiece aperture toward the user's mouth.

11. A game call with a volume enhancing and tone stabilizing coil spring comprising:
    an open top sound box formed by a pair of oppositely facing side walk, each side wall having a top edge, a front end wall, a rear end wall, and a base, wherein the side walk, front and rear end walls, and base form interior walls and a sound chamber space defined by the interior walls and the open top of the sound box,
    a paddle having a paddle top, a paddle bottom, and a handle at one end of the paddle, wherein the paddle is disposed over the open top of the sound box with the paddle bottom facing the open top, and wherein the paddle is swivably disposed at one of said front or rear end walls so that the paddle bottom may be rubbed against the top edges of the side walls of the sound box to produce a sound,
    a coil spring having a base end, an unrestrained end opposite the base end, and a length defined by the distance between the base and unrestrained ends, wherein the coil spring is disposed within the sound chamber and secured at the base end to one of the interior walk so that the unrestrained end of the coil spring is not in contact with an interior wall or the paddle bottom.

12. The game call with a volume enhancing and tone stabilizing coil spring of claim 11 further wherein the coil spring is formed of spring wire having a gauge between 12 and 16.

13. The game call with a volume enhancing and tone stabilizing coil spring of claim 11 wherein the coil spring is formed of spring wire having a gauge of 14.

14. The game call with a volume enhancing and tone stabilizing coil spring of claim 11, wherein the base end of the coil spring is secured to the base of the sound box.

15. The game call with a volume enhancing and tone stabilizing coil spring of claim 11 further comprising a rubber cap over the unrestrained end of the coil spring.

* * * * *